United States Patent
He et al.

(10) Patent No.: US 12,375,471 B2
(45) Date of Patent: Jul. 29, 2025

(54) SECURELY DELIVER DECRYPTED DATA OF MIRRORED VPN TRAFFIC

(71) Applicant: Palo Alto Networks, Inc., Santa Clara, CA (US)

(72) Inventors: Zhanglin He, Menlo Park, CA (US); Tripti Agarwal, Fremont, CA (US); Kavitha Sivagnanam, San Mateo, CA (US); Tushar Vyankatesh Nargunde, San Jose, CA (US); Jose Carlos Sagrero Dominguez, Lilburn, GA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 191 days.

(21) Appl. No.: 18/362,600

(22) Filed: Jul. 31, 2023

(65) Prior Publication Data
US 2025/0047657 A1   Feb. 6, 2025

(51) Int. Cl.
| | | |
|---|---|---|
| *H04L 9/00* | (2022.01) | |
| *H04L 9/40* | (2022.01) | |
| *H04L 12/46* | (2006.01) | |
| *H04W 4/06* | (2009.01) | |

(52) U.S. Cl.
CPC ...... *H04L 63/0823* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 9,853,811 B1* | 12/2017 | Levy | H04L 9/088 |
| 11,184,331 B1* | 11/2021 | Berg | H04N 21/41407 |
| 11,852,195 B2* | 12/2023 | An | F16C 33/3806 |
| 2016/0156594 A9* | 6/2016 | Inforzato | H04L 63/12 |
| | | | 713/168 |
| 2018/0123829 A1* | 5/2018 | Abraham | H04L 43/08 |

FOREIGN PATENT DOCUMENTS

EP   2154822 A2 *   2/2010   ............ H04L 12/18

\* cited by examiner

*Primary Examiner* — Christopher B Robinson
(74) *Attorney, Agent, or Firm* — Gilliam IP PLLC

(57) ABSTRACT

An orchestrator that manages security appliances for an organization determines a sink configured for traffic mirroring and correspondingly configures components for secure conveyance of mirrored traffic to a sink. The orchestrator configures a VM associated with the mirroring sink to use correlated packets and tunnel keys to securely convey the packets to an organization. The virtual machine decrypts each set of packets with the correlated tunnel key in memory and then re-encrypts the packets with a cryptographic key (hereinafter "random key") generated on-the-fly for use on the current set of decrypted packets in memory. The virtual machine then encrypts the random key with a public key of the organization that will monitor and/or analyze the traffic data and writes the encrypted packets and/or packet contents and encrypted random key to a specified repository of the organization.

20 Claims, 8 Drawing Sheets

SECURELY DELIVER DECRYPTED DATA OF MIRRORED VPN TRAFFIC

BACKGROUND

The disclosure generally relates to electric digital data processing (e.g., CPC class G06F) and relates to protecting data (e.g., CPC subclass G06F 21/62).

National Institute of Standards and Technology (NIST) Special Publication 800-77 Revision 1 states "Internet Protocol Security (IPsec) is a suite of open standards for ensuring private communications over public networks. IPsec is typically used to encrypt Internet Protocol (IP) traffic between hosts in a network and to create a virtual private network (VPN). IPsec includes two primary protocols: 1) the Internet Key Exchange (IKE) protocol, and 2) the Encapsulating Security Payload (ESP) protocol. The IKE protocol is used to negotiate parameters and security keys.

Typically, IKE runs as a privileged process, while IPsec usually runs as part of the operating system kernel. The IKE process is responsible for configuring the kernel for IPsec. The kernel handles packet encryption and decryption operations. The IKE process can insert a policy into the kernel to instruct the kernel to warn the IKE process when an unencrypted packet satisfying matching criteria, such as matching specified source and destination IP addresses, will be transmitted. If IPsec peers can mutually authenticate each other and agree on other policy details, then the IKE process can negotiate an IPsec tunnel.

BRIEF DESCRIPTION OF THE DRAWINGS

Embodiments of the disclosure may be better understood by referencing the accompanying drawings.

DESCRIPTION

Figure 1:
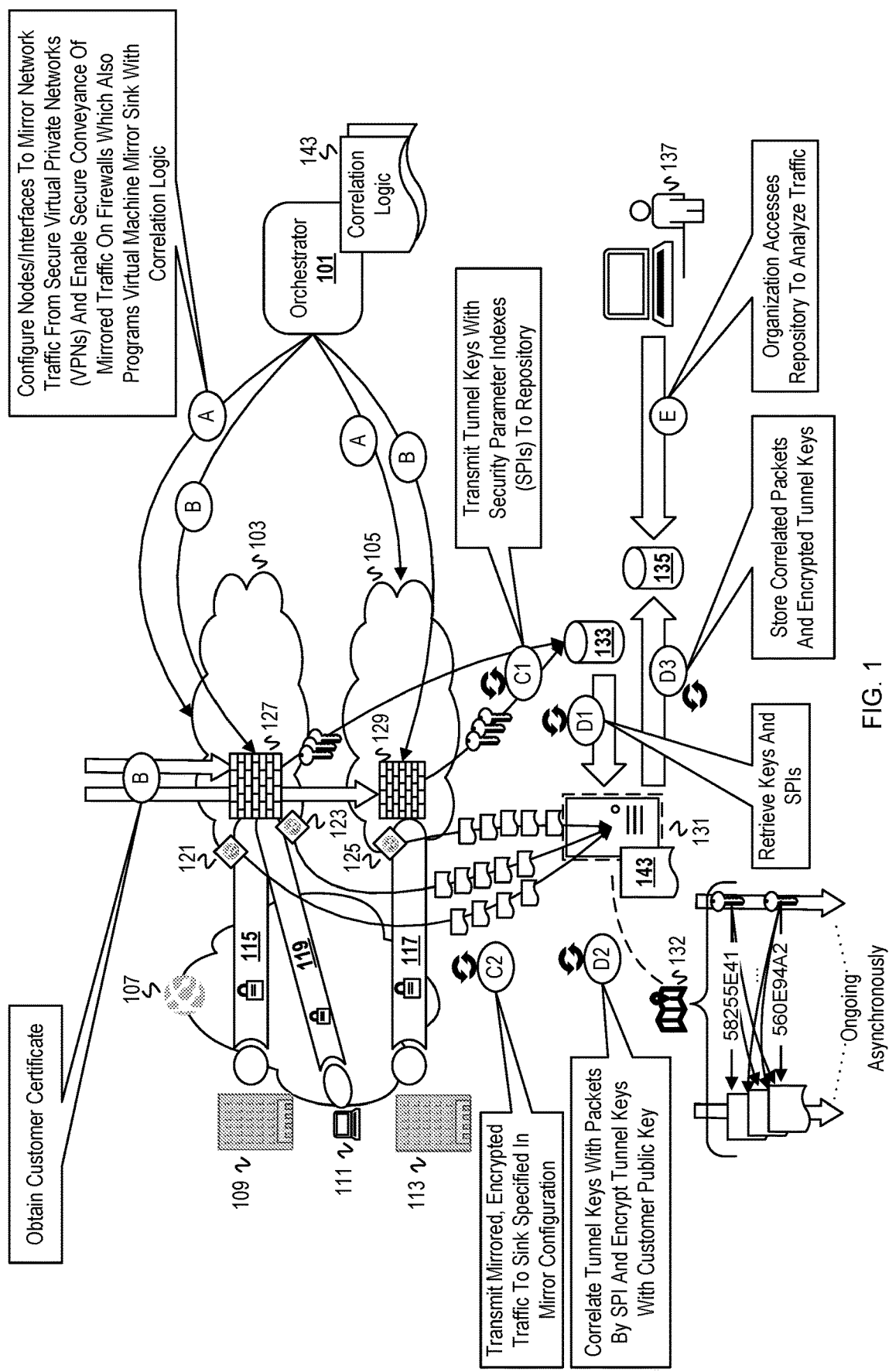
FIG. 1 is an example diagram of correlating traffic mirrored from secure VPN tunnels and tunnel keys in a cloud-based infrastructure supporting the traffic mirroring and securely conveying the correlations.

The description that follows includes example systems, methods, techniques, and program flows to aid in understanding the disclosure and not to limit claim scope. Well-known instruction instances, protocols, structures, and techniques have not been shown in detail for conciseness.

Terminology

The term "logic" is used to refer to program code or a combination of hardware and program code that performs a task(s) or causes a machine/device to perform a task(s) when running. For efficiency in description, logic can be an instance of running (e.g., executing or being interpreted) program code or program code residing on a medium.

The term "security appliance" refers to a device with one or more cybersecurity capabilities or software that can program a machine (physical or virtual) to have one or more cybersecurity capabilities.

The terms "communication channel" and "channel" refer to a logical connection between a source and a sink regardless of the underlying medium. In this description, different channels at least have different sinks. A sink can be a repository (e.g., cloud-based storage) or a compute instance (e.g., a virtual machine).

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Introduction

The adoption of cloud-based infrastructure and services and software defined wide area network (SD-WAN) technology by organizations has a corresponding reliance on secure transmission of data. Thus, customer edge endpoints typically establish secure virtual private networks (VPNs) that use tunneling to securely transmit data across public networks. In some cases, data will have multiple layers of protection. For example, customer edge endpoints will establish an IPsec tunnel and within that connection establish a Hypertext Transfer Protocol Secure (HTTPS) session protected according to the Transport Layer Security (TLS) protocol. Although organizations have adopted cloud-based offerings, organizations often want to monitor and/or analyze the network traffic without impeding the network traffic. Cloud service providers offer functionality to mirror network traffic to facilitate monitoring and/or analysis. However, the encrypted network traffic obstructs or at least presents a hurdle to monitoring or analyzing the network traffic.

Overview

While avoiding the performance impact of traffic mirroring, a security service/product can complement traffic mirroring performed by a cloud-service provider with correlation of mirrored traffic and cryptographic keys that traverse different channels when mirrored and secure conveyance technologies disclosed herein. An orchestrator that manages security appliances for an organization determines a sink configured for traffic mirroring and correspondingly configures components for the correlation and secure conveyance. The orchestrator also configures the security appliances. The orchestrator configures the security appliances to copy cryptographic keys (hereinafter "tunnel keys") and connection identifiers associated with the keys of secure VPN tunnels established by the security appliances to a repository of the cloud-service provider. The orchestrator configures a virtual machine (VM) associated with the mirroring sink, which in some cases the VM is the mirroring sink, with correlation logic and secure conveyance logic.

The correlation logic programs the VM to correlate sets of packets aggregated across different mirroring streams and tunnel keys with connection identifiers. The correlation logic programs the VM to accommodate the packets being asynchronously communicated over a different communication channel than the tunnel keys and connection identifiers. Correlating the sets of packets and the tunnel keys facilitates secure conveyance.

When programmed with the secure conveyance logic, the VM uses the correlations of packets and tunnel keys to securely convey the packets and/or packet contents (e.g., payloads) to an organization. The VM decrypts each set of packets with the correlated tunnel key in memory and then re-encrypts the packets with a cryptographic key (hereinafter "random key") generated on-the-fly for use on the current set of decrypted packets in memory. Performing these operations in memory of the VM achieves a level of security that prevents even support personnel of the cloud service provider (e.g., members of a site reliability engineering (SRE) team) from accessing the data. The VM then encrypts the random key with a public key of the organization that will monitor and/or analyze the traffic data and writes the encrypted packets and/or packet contents and encrypted random key to a specified repository of the organization.

Example Illustrations

FIG. 1 is an example diagram of correlating traffic mirrored from secure VPN tunnels and tunnel keys in a cloud-based infrastructure supporting the traffic mirroring and securely conveying the correlations. The illustrated example includes an orchestrator 101 that manages firewalls 127, 129 for an organization. The orchestrator 101 has SD-WAN capabilities to facilitate managing firewalls and cloud-based infrastructure/services of an enterprise network. The organization has an enterprise network that includes branch sites 109, 113 and a monitoring/analysis site 137. The monitoring/analysis site 137 may be at a branch site of the organization (e.g., branch sites 109, 113). The firewalls 127, 129 are deployed in virtual private clouds 103, 105, respectively. For this example, secure VPN tunnels 115, 117, 119 will be established over a public network 107. The secure VPN tunnel 115 will be established between an edge device at the branch site 109 and the firewall 127. The secure VPN tunnel 117 will be established between an edge device at the branch site 113 and the firewall 129. For remote access, the secure VPN tunnel 119 will be established between a computer 111 and the firewall 127. FIG. 1 only depicts a small number of tunnels and firewalls. For an actual enterprise network, the scale would be greater. Although depicting the scale would aid in understanding the magnitude of efficiency provided by the disclosed technology, it would also yield overly complex illustrations and likely interfere with explaining the technology.

FIG. 1 is annotated with a series of letters A, B, C1-C2, D1-D3, and E representing stages of operations. Each stage represents one or more operations. Some of the stages occur concurrently and asynchronously. For instance, the operations of stages C1 and C2 occur asynchronously and concurrently. Depictions of a circular arrow above a stage annotation indicates the stage is ongoing. Although these stages are ordered for this example, the stages illustrate one example to aid in understanding this disclosure and should not be used to limit the claims. Subject matter falling within the scope of the claims can vary from what is illustrated.

At stage A, an orchestrator 101 configures nodes/interfaces 121, 123, 125 to mirror network traffic to a sink 131 and enables secure conveyance of mirrored traffic on the firewalls 127, 129. In addition, the orchestrator 101 programs the sink 131, depicted as a virtual machine, with correlation logic 143. Programming the sink 131 with logic may be creating or instantiating a VM based on an image that includes the logic. For example, the orchestrator 101 forms a request that indicates source and destination for mirrored traffic and configuration specifying an image template for a VM or group of VMs indicated as the destination. The request is then submitted to the cloud service platform that provides the mirroring service. As part of enabling the secure conveyance feature on the firewalls 127, 129, the orchestrator 101 requests instantiation of a cloud-based repository 133 and communicates with the firewalls 127, 129 to cause them to copy tunnel keys and associated connection identifiers to the repository 133. If the firewalls 127, 129 already have the program code for this functionality, then the communication from the orchestrator 101 enables the functionality. Otherwise, the communication from the orchestrator 101 includes the program code or directs the firewalls 127, 129 to retrieve the program code. Enabling the feature may be a part of onboarding firewalls for an organization. Thus, the operations would repeat when additional firewalls are onboarded unless the organization desires a different configuration.

At stage B, the firewalls 127, 129 obtain certificates of the organization corresponding to the enterprise network. Implementations can transmit the certificate from the orchestrator 101, for example while onboarding. For instance, a customer can upload a certificate via an interface of the orchestrator 101 which then communicates the certificate to a mirrored traffic sink or another computing entity that will perform the correlation and/or secure conveyance operations.

At stage C1, the firewalls 127, 129 copy tunnel keys and security parameter indexes (SPIs) to the repository 133 after establishing the secure VPN tunnels 115, 117, 119. After the tunnel 115 is established, the firewall 127 copies its tunnel endpoint key and the SPI to the repository 133. After the tunnel 117 is established, the firewall 127 copies its tunnel endpoint key and the SPI for the tunnel 117 to the repository 133. After the tunnel 117 is established, the firewall 127 copies its tunnel endpoint key and the SPI for the tunnel 117 to the repository 133.

At stage C2, the interfaces/nodes 121, 123, 125 mirror network traffic traversing the interfaces to the sink 131. The infrastructure of the cloud service provider expends the computing resources for mirroring the traffic to the sink 131.

At stage D1, the virtual machine sink 131 retrieves tunnel keys and SPIs from the repository 133. At the scale of an actual enterprise network, the retrieval would be ongoing, either schedule driven or event driven, since tunnel establishment and delivery of tunnel keys and SPIs would be ongoing and non-deterministic. Depending on retrieval size and/or tunnel key expiration, the virtual machine (VM) sink 131 may retrieve the same set of tunnel keys, an entirely new set of tunnel keys, or a mix of previously retrieved and new tunnel keys.

At stage D2, the VM sink 131 correlates retrieved tunnel keys and packets of the mirrored network traffic by SPIs. The VM sink 131 builds a map 132 of the retrieved set of tunnel keys. The map indexes the keys with compact representations of the SPIs. For instance, the VM sink 131 computes hash representations of the SPIs. Since the VM sink 131 receives multiple streams of mirrored network traffic, the VM sink 131 aggregates packets from the different streams into sets (e.g., captures the packets into a packet capture (pcap) file). The VM sink 131 then examines each packet in the set to determine whether a packet indicates an SPI that matches an SPI of the retrieved set of tunnel keys. With the map 132, the VM sink 131 can parse the set of packets to extract the SPIs found and compute hash representations to then determine whether there are any matches to map 132 indexes. For a match, the corresponding packets are correlated with the tunnel key that maps to the index. In FIG. 1, the map 132 associates an identifier 58255e41 with a first key and an identifier 560e94a2 with another key. The sink 131 searches each packet for each identifier and, when found, correlates the packet with the corresponding key. After correlation is performed for the set of packets, the tunnel key is encrypted with the public key from the certificate of the organization.

At stage D3, the VM sink 131 stores the correlated packets and encrypted tunnel keys into a repository 135. The repository 135 may be a database into which a packets and encrypted tunnel keys can be stored and associated based on the associations determined from the correlations. When programming the VM sink 131, the orchestrator 101 would have specified the repository 135 for storage of correlated packets and encrypted tunnel keys according to specification by the customer/organization. For instance, after instantiating a VM based on an image with the logic, the orchestrator 101 sets a location for the correlated data. After or concurrent with storing the correlated packets and tunnel keys, the VM sink 131 processes a next set of packets from the streams of mirrored traffic.

At stage E, the organization/customer 137 accesses the repository 135 to monitor and/or analyze the traffic. For example, a monitoring/analysis tool of the organization can be configured to read from the repository 135. The tool would decrypt the tunnel keys with the organization's private key to allow monitoring and analysis of the packets.

FIG. 1 depicts the VM sink 131 and the repositories 133, 135 as distinct from the private clouds 103, 105. This was done merely to suggest the possibility that the component correlation and secure conveyance of correlated packets and tunnel keys is not necessarily on the same cloud service provider infrastructure as the private clouds 103, 105. In addition, the repository 135 that is the target for the monitoring/analyzing by an organization may be external to the cloud service provider infrastructure that supports the sink 131 and the repository 133.

Figure 2:
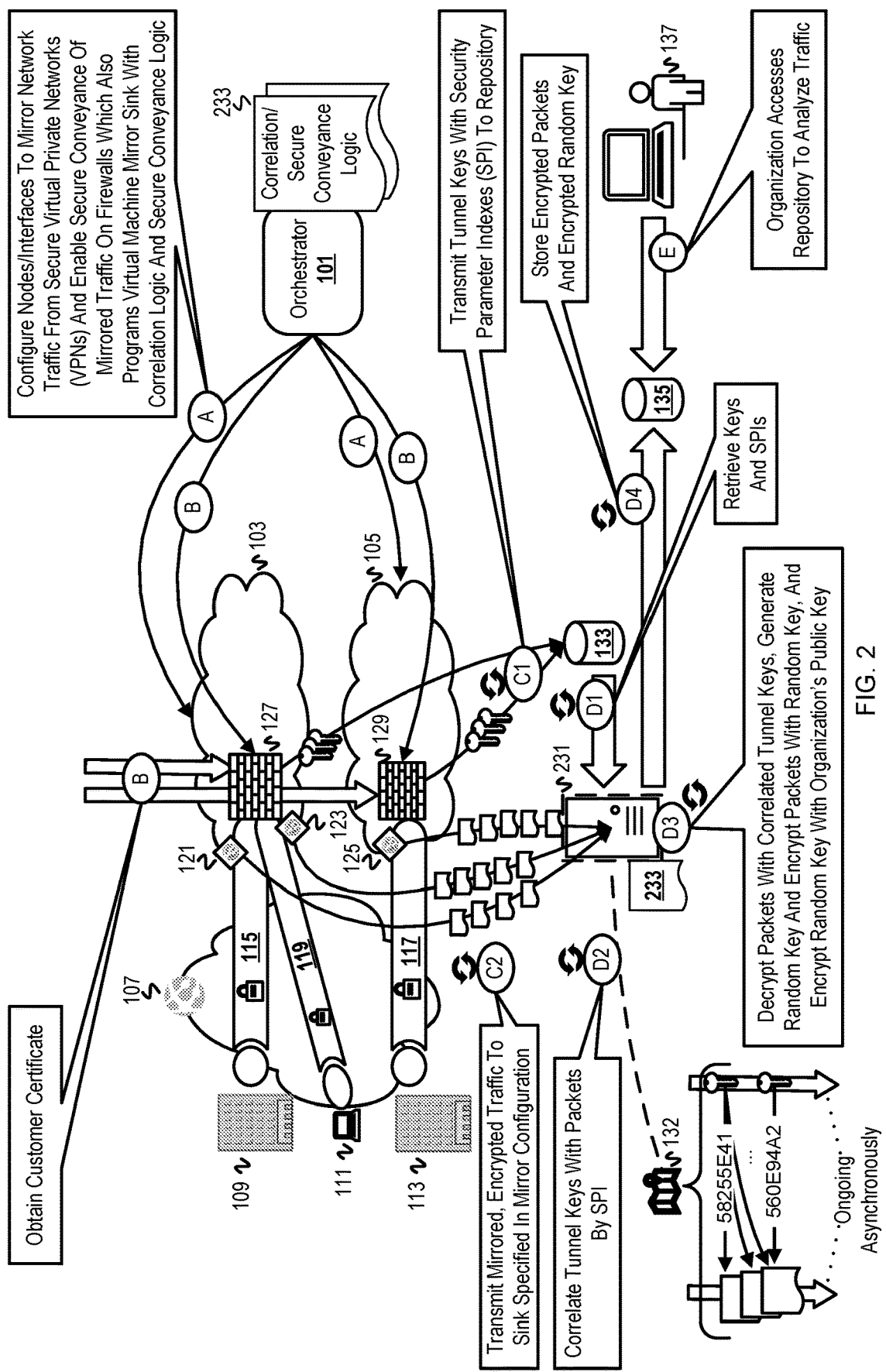
FIG. 2 is an example diagram of correlating traffic mirrored from secure VPN tunnels and tunnel keys in a cloud-based infrastructure supporting the traffic mirroring and securely conveying content extracted from the mirrored traffic.

FIG. 2 is an example diagram of correlating traffic mirrored from secure VPN tunnels and tunnel keys in a cloud-based infrastructure supporting the traffic mirroring and securely conveying content extracted from the mirrored traffic. While providing correlated packets and tunnel keys facilitates monitoring and/or network traffic analysis, a security service/product can also manage the responsibility of decrypting packets per tunnel key while still securely conveying the packets and contents. Most elements depicted in FIG. 2 are the same as those depicted in FIG. 1. A VM sink 231 is labeled differently since it is programmed differently than the VM sink 131 of FIG. 1. Descriptions of similar stages with respect to FIG. 1 are truncated for efficiency.

At stage A, the orchestrator 101 configures nodes/interfaces 121, 123, 125 to mirror network traffic to a VM sink 231 and enables secure conveyance of mirrored traffic on the firewalls 127, 129. In addition, the orchestrator 101 programs the VM sink 231 with correlation logic and secure conveyance logic. Stage A of FIG. 2 is similar to stage A of FIG. 1 with the exception of the additional programming of the VM sink 231.

Stages B, C1, C2, and D1-D2 of FIG. 2 are similar to the same stages in FIG. 1. Therefore, the descriptions will not be repeated.

At stage D3, the VM sink 231 runs the secure conveyance logic on correlated packets and tunnel keys. The VM sink 231 loads each set of correlated packets and tunnel keys into memory of the VM sink 231. For each set of correlated packets and tunnel keys, the VM sink 231 generates a random key. The VM sink 231 decrypts each set of packets with the correlated tunnel keys and then re-encrypts the packets with the generated random key. The VM sink 231 then encrypts the random key with the public key from the certificate of the organization.

At stage D4, the VM sink 231 stores the encrypted set of packets and encrypted random key into the repository 135. The repository 135 hosts a database or other organizational store that maintains associations between encrypted packet sets and the corresponding encrypted random keys. After or concurrent with storing the encrypted set of packets and random key, the VM sink 331 processes a next set of packets from the streams of mirrored traffic.

At stage E, the organization/customer 137 accesses the repository 135 to monitor and/or analyze the traffic. Instead of a set of packets possibly being associated with multiple tunnel keys, the secure conveyance technology depicted in FIG. 2 simplifies the access since the organization uses its own private key and one random key is used to decrypt a set of packets. Thus, the data pre-processing for the monitoring/analysis may be more efficient.

Figure 3:
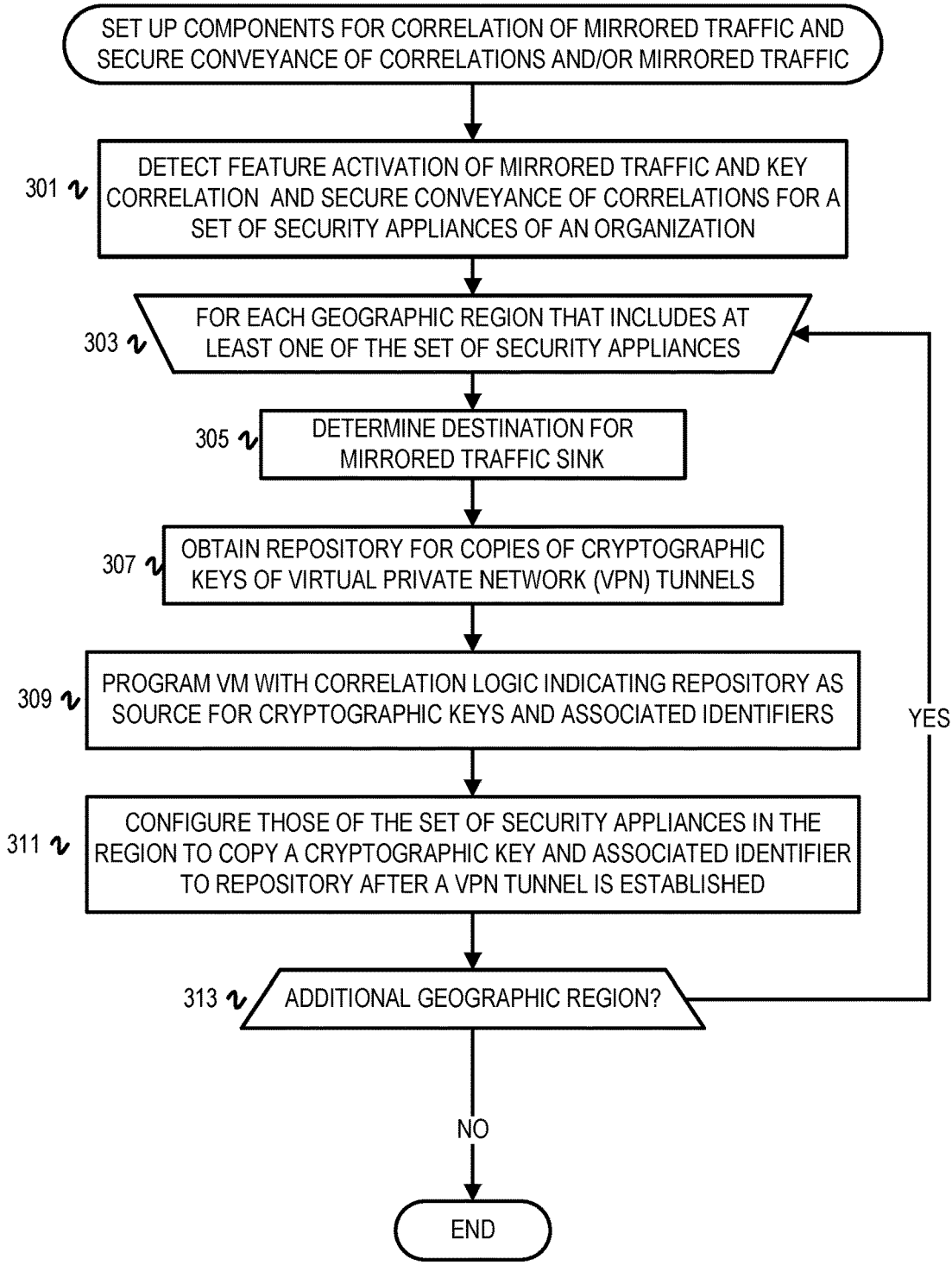
FIG. 3 is a flowchart of example operations to set up components for correlation of mirrored traffic and secure conveyance of the correlations and/or the mirrored traffic.
Figure 4:
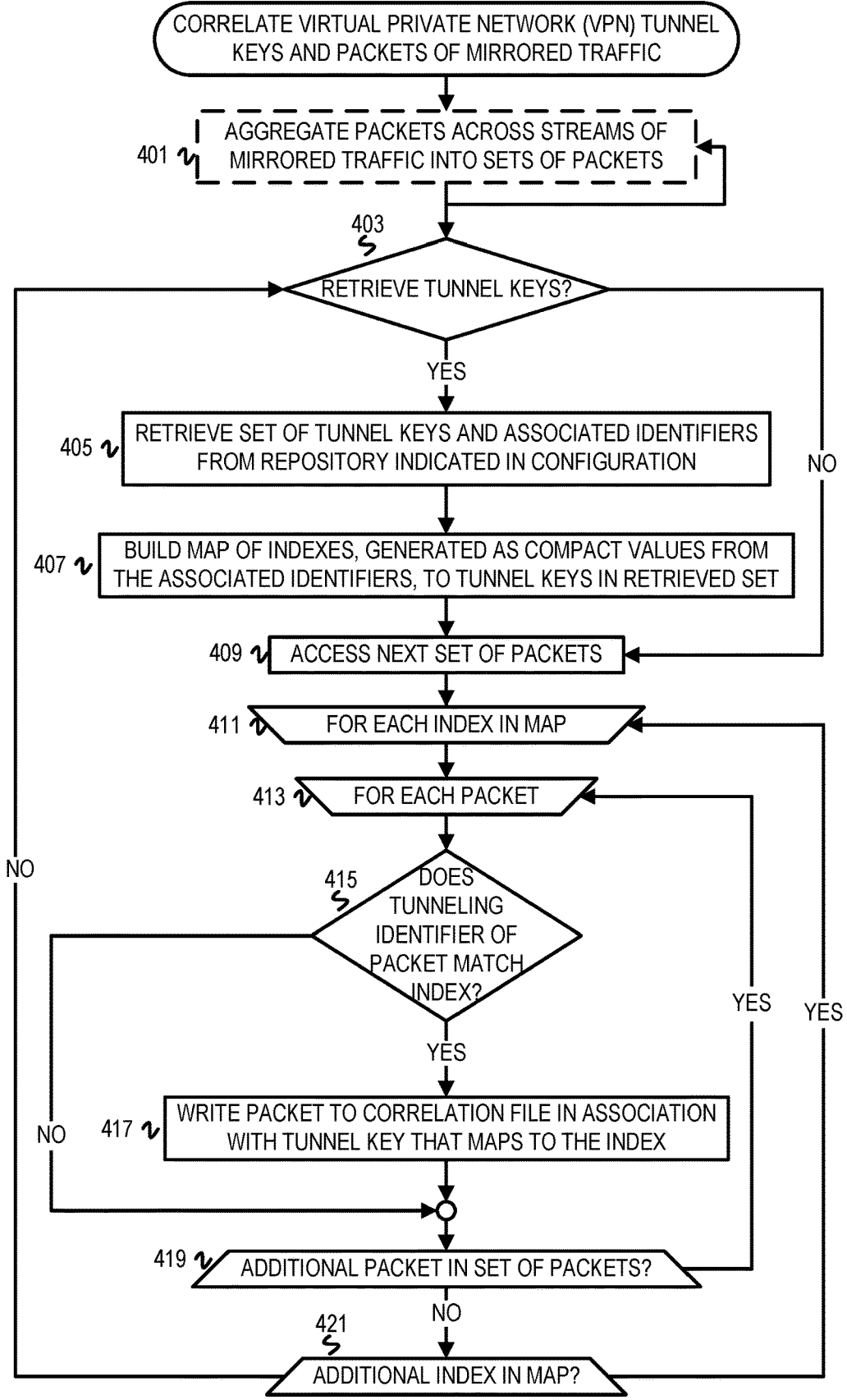
FIG. 4 is a flowchart of example operations for correlating VPN tunnel keys and packets of mirrored traffic.
Figure 5:
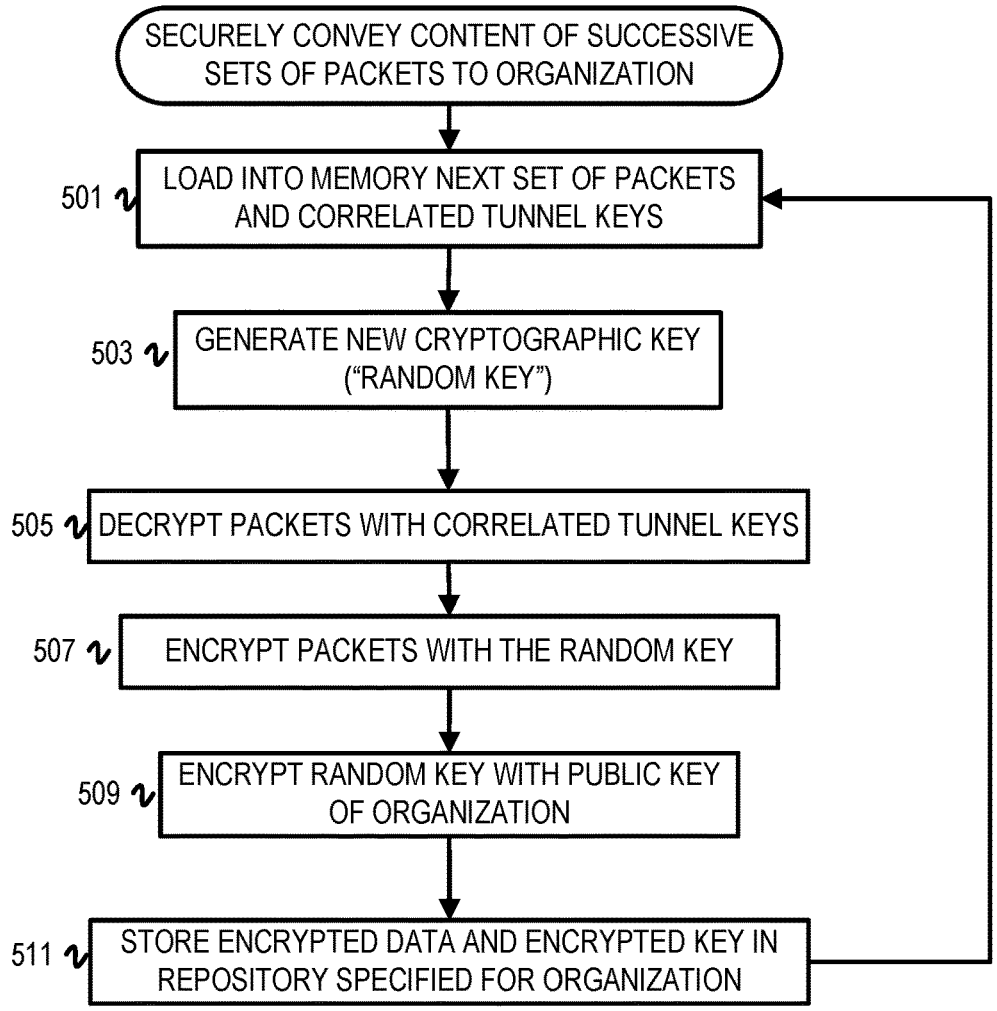
FIG. 5 is a flowchart of example operations for securely conveying content of successive sets of packets to an organization.

FIGS. 3-5 are flowcharts of example operations intended to explain the disclosed technology in more general terms than the example scenario depicted in FIGS. 1-2. The example operations are described with reference to the components depicted in FIG. 1 for consistency and ease of understanding. The names chosen for the components, which represent program code or devices programmed with program code, is not to be limiting on the claims. Structure and organization of program code can vary due to platform, programmer/architect preferences, programming language, etc. In addition, names of code units (programs, modules, methods, functions, etc.) can vary for the same reasons and can be arbitrary.

FIG. 3 is a flowchart of example operations to set up components for correlation of mirrored traffic and secure conveyance of the correlations and/or the mirrored traffic. The operations are described with reference to an orchestrator which will have awareness (e.g., by configuration or input) of traffic mirroring configuration and permissions to configure security appliances and a virtual machine associated with a mirroring sink and to request a cloud-based storage.

At block 301, the orchestrator detects activation for a set of security appliances of a feature(s) for mirrored traffic and key correlation and secure conveyance of the correlations. As an example, the orchestrator can determine based on a license acquired by an organization the features to be activated for a set of security appliances. This can be done when onboarding the security appliances. The detection may be detection of an input via a user interface, detection of the indicated feature(s) when processing a license, detection of feature configuration when spinning up security appliances, etc.

At block 303, the orchestrator begins setting up components based on the feature activation for each geographic region in which at least one of the set of appliances is located. An enterprise network can have assets in multiple geographic regions. Since geographic proximity being one factor in performance, an organization typically organizes assets by geographic region. With the computational expense of cryptographic operations, the components would be set up according to geographic regions.

At block 305, the orchestrator determines a destination(s) for the mirrored traffic sink. The destination may be specified via a user interface as part of configuring the mirroring feature. The orchestrator selects the image template that includes the programming for correlating and/or secure conveyance and includes creation of a VM(s) based on the template as part of the mirroring request.

At block 307, the orchestrator obtains a repository ("key repository") for copies of cryptographic keys of VPN tunnels ("tunnel keys"). The orchestrator transmits a request, directly or via an intermediary (e.g., via an account per region), to provision a cloud-based storage. The request can specify the geographic region depending upon infrastructure management by the cloud service provider. The orchestrator can include flags/settings to secure the repository and to sufficiently size the repository to host tunnel keys that accumulate within a key retrieval interval. The flags/settings can limit reading to the virtual machine programmed with the correlation logic. Additional settings may require cleaning the repository periodically and prior to release.

At block 309, the orchestrator programs the VM with the correlation logic indicating the key repository as the source for tunnel keys and associated identifiers. For instance, the orchestrator can install and run an image with the correlation logic on the VM.

At block 311, the orchestrator configures those of the set of security appliances in the geographic region to copy tunnel keys and associated identifiers to the key repository. The orchestrator configures each security appliance to copy a tunnel key and its associated identifier (e.g., SPI) to the key repository after the corresponding tunnel is established. Assuming the program code for this task is already installed on the security appliance, the configuration would involve setting the program code to be active and indicating the key repository as a destination for the tunnel key copies and associated identifiers. If the program code for the task does not already reside on the security appliance, then configuration would be installing the program code and indicating the key repository as the destination. In some cases, configuration can also include providing permission and/or authorization for the security appliance to write to the key repository.

At block 313, the orchestrator determines whether there is an additional region in which to set up components for the activated feature. If so, operational flow returns to block 303. Otherwise, operational flow for FIG. 3 ends.

FIG. 4 is a flowchart of example operations for correlating VPN tunnel keys and packets of mirrored traffic. Description of the operations of FIG. 4 refers to a VM as performing the operations.

At block 401, the VM aggregates packets across streams of mirrored traffic into sets of packets. Aggregating the packets into sets can be capturing packets across streams into a pcap file. If each stream is written into a distinct buffer, the VM can capture packets according to a round robin algorithm. If the streams are written into a single buffer, the VM will aggregate according to a defined size limit for packet sets (e.g., maximum pcap file size). Block 401 is depicted in a dashed line to recognize a possible implementation that a different computing entity captures the packets from the streams of mirrored traffic and provides the aggregated sets of packets to a VM with the correlation logic.

At block 403, the VM determines whether to retrieve tunnel keys from the key repository. Implementation of the correlation logic can define a key retrieval interval based on time or data size. For example, correlation logic can include a parameter that specifies a periodic key retrieval (e.g., every minute). As another example, the correlation logic can include a parameter that specifies key retrieval when n pcap files have been generated. As another example of data size based key retrieval, an event can be generated and communicated to the VM that n tunnel key and associated identifier pairs have been written into the key repository. If a criterion for key retrieval is satisfied, then operational flow proceeds to block 405. Otherwise, operational flow proceeds to block 409.

At block 405, the VM retrieves a set of tunnel keys and associated identifiers from the key repository that was indicated during configuration/programming of the VM. Depending upon the platform, the VM may transmit a HTTP GET request to retrieve the tunnel keys and associated identifiers. As another example, the VM may invoke a function defined by an application programming interface (API) of the cloud-based storage to read from the key repository.

At block 407, the VM builds a map of indexes to the tunnel keys of the retrieved set of tunnel keys. The VM generates compact representations (e.g., hash values) of the associated identifiers paired with the tunnel keys and uses the compact representations as indexes to the tunnel keys.

At block 409, the VM accesses a next set of packets. Initially, the "next" set of packets would be the first set of packets. Implementations can program the VM to access more than one set of packets per key retrieval interval. Accessing can be opening a pcap file for reading or loading the set of packets into a memory of the VM.

At block 411, the VM begins iterating through the indexes in the map. At block 413, the VM begins parsing each packet in the accessed set of packets. Based on known formatting of the packet mirrored from a VPN tunnel, the VM can scan or skip to a location at which an identifier is expected to be found. For example, the VM can skip over bytes allocated to an Internet Protocol (IP) header of a tunnel and to a field within an Authentication Header to read the SPI for a packet. When proceeding to the next packet in the packet set, the VM can skip to the end of the current packet based on either a delimiter or packet size for the known format of IPsec encapsulation for tunnel mode. Although the SPI is not a tunnel identifier, the SPI can be referred to as a tunneling identifier as it represents state or the Security Association established between hosts, similar to a session.

At block 415, the VM determines whether the tunneling identifier of the packet matches the index. The VM computes the compact representation of the tunneling identifier and determines whether it matches the index. If there is a match, then operational flow proceeds to block 417. If there is not a match, then operational flow proceeds to block 419.

At block 417, the VM writes the packet to a correlation file in associated with the tunnel key that maps to the index. Since the mirrored packets and the pairs of tunnel keys and associated identifiers are asynchronously communicated over different channels, a packet in a set of packets may not be from a tunnel corresponding to a tunnel in the currently retrieved set of tunnel keys. Thus, the packets with tunneling identifiers that match the associated identifiers of the tunnel keys (e.g., based on matching compact representations) are written to a new file. In addition, the tunnel key that maps to the matching index is associated with the packet. The tunnel key likely is associated with multiple packets. The association can be indicated as metadata in the file in which the packets are written or the associations can be written in a separate file that resolves a tunnel key to corresponding packets.

At block 419, the VM determines whether there is an additional packet in the set of packets to examine. If there is an additional packet, then operational flow returns to block 413. Otherwise, operational flow proceeds to block 421.

At block 421, the VM determines whether there is an additional index in the map. If there is an additional index, then operational flow returns to block 411. Otherwise, operational flow returns to block 403. If a key retrieval criterion is not satisfied, then the VM will examine a next set of packets based on the currently retrieved tunnel key set.

Although FIG. 4 depicts example operations that would traverse the set of packets n times when the map has n tunnel indexes, this is not necessary. Different mapping and processing techniques can be employed that vary in efficiency depending upon available resources and architecture. For example, the VM can extract tunneling identifiers and packet locations from the set of packets. The VM can then compute compact representations of the extracted tunneling identifiers and compare against the indexes of the map. For those that match, the VM can use the location information to either remove non-matching packets from the set or create a new set with the matching packets. Moreover, the example operations of FIG. 4 presume that tunnel key retrieval drives the correlating. Embodiments can instead drive the correlating from packet collection. Packets can be aggregated across the streams of mirrored traffic until a collection criterion is satisfied. This criterion can be a number of packets, amount of data, time interval, etc. For example, packets can be captured/collected until a pcap file reaches a defined file size, such as 200 megabytes. When the packet collection criterion is satisfied, then a set of tunnel keys and associated identifiers would be retrieved. Referring to FIG. 4, block 403 would determine whether the collection criterion is satisfied instead of a key retrieval criterion. If not, then packets would continue being collected at block 401. If the collection criterion is satisfied then the tunnels keys would be retrieved as indicated in block 405. This can be a command or request to synchronize the tunnel keys and associated identifiers currently stored at the VM with those stored in the repository updated by the security appliances. Instead of block 409, operational flow would proceed from block 407 to block 413. Instead of iterating through the map and searching the packet collection for matches with the index of a tunnel key of a current iteration, the correlating would traverse the packet collection and for each packet search the map for a matching index. After the last packet in the collection (e.g., last packet of pcap file), operational flow would proceed from block 419 back to determining whether a collection criterion is satisfied.

After correlating tunnel keys with packets from the different mirrored streams of traffic, the VM can write the correlated packets and tunnels keys to a repository for use by an organization. The organization would use the tunnel keys to decrypt the packets and analyze the mirrored packets. Embodiments can also encrypt the tunnel keys with a public key of the organization for additional security. However, secure conveyance logic as discussed earlier can also be used to both protect the data (i.e., packets and packet contents) and allow an organization to efficiently access the data.

FIG. 5 is a flowchart of example operations for securely conveying content of successive sets of packets to an organization. Description of the example operations refer to a VM as performing the operations. Although FIG. 5 (and other examples herein) refer to a public key as an example of asymmetric cryptography to secure data and/or tunnel keys after correlation, other asymmetric cryptographic systems can be used that still provide confidence that the encrypted data cannot be decrypted by an entity other than intended. The example operations refer to a public key that was obtained in advance, for example during onboarding, from a customer/organization.

At block 501, the VM loads into memory a next set of packets and correlated tunnel keys. Correlation has already been performed at this point, and the VM is loading the next set of correlated packets (initially the first set of correlated packets) into memory of the VM. This memory operates as volatile memory that will be cleaned before recovery when the VM is shut down. In addition, access to the memory is limited to the VM.

At block 503, the VM generates a new cryptographic key, previously referred to as the random key. The secure conveyance logic can include a random key generator for a specified key length that will generate a random key. The secure conveyance logic can also include a pseudo-random number generator to generate an initialization vector (IV) or starting variable in the case of Cipher Block Chaining (CBC). The random key and IV are generated on-the-fly for each successive set of packets. For instance, a random key and IV are generated for each pcap file to be securely conveyed to the organization.

At block 505, the VM decrypts the packets with the correlated tunnel keys. The decrypted packets are written in the memory.

At block 507, the VM encrypts the packets with the random key. For instance, the VM can use an encryption algorithm according to the Advanced Encryption Standard in CBC mode with the random key, IV, and plaintext blocks from decrypted packets as inputs.

At block 509, the VM encrypts the random key with the public key of the organization. For example, the VM writes the random key and the IV to a file and then encrypts the file.

At block 511, the VM stores the encrypted data and encrypted key in a repository specified for the organization. The encrypted data are the encrypted packets, but can also include payloads decapsulated from the packets to allow for analysis of the packets as traffic and analysis of the payloads. Operational flow returns to block 501 for loading an additional set of packets and correlated tunnel keys into memory.

Figure 6:
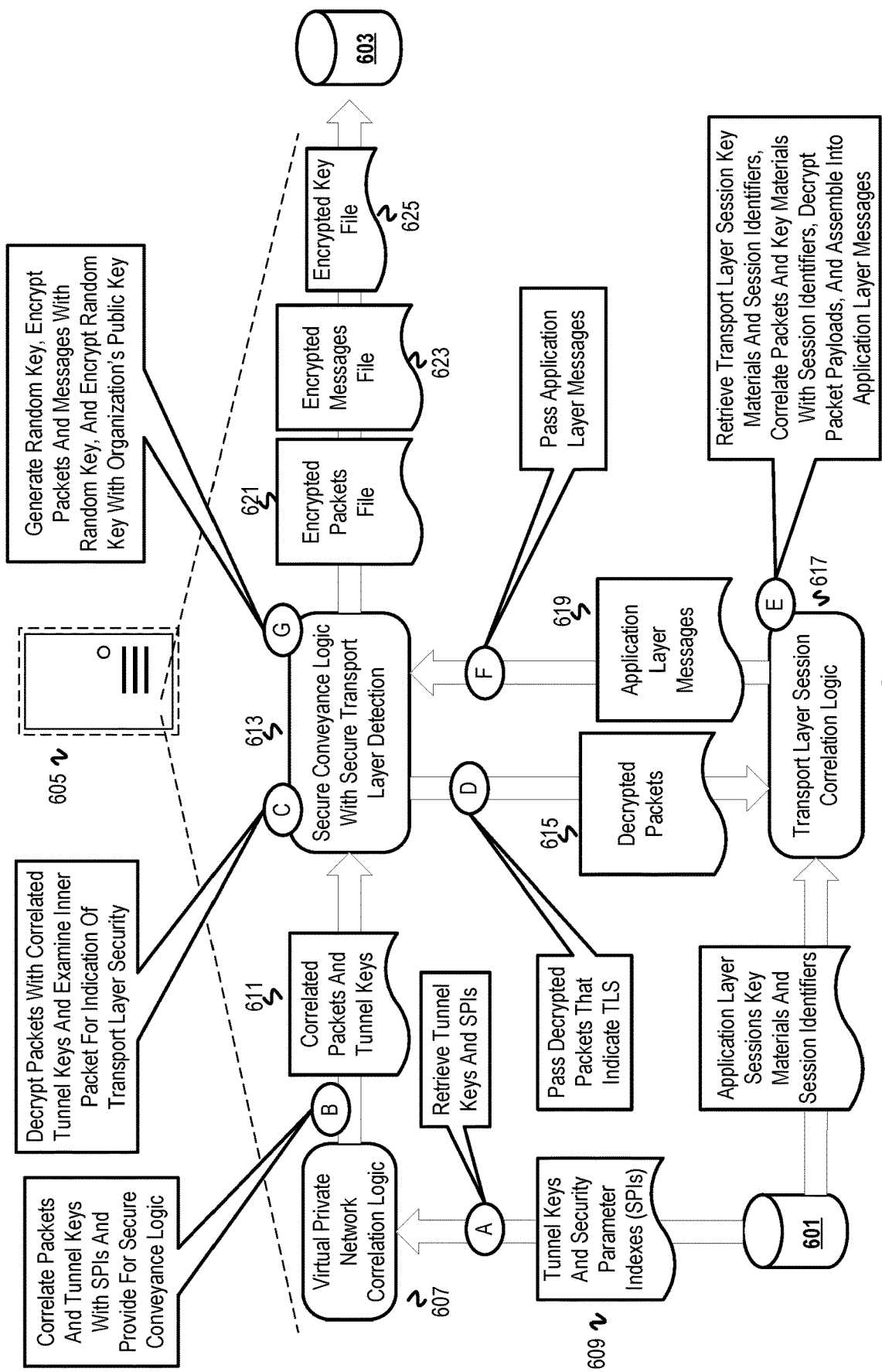
FIG. 6 is an example diagram of a multi-level correlation and secure conveyance pipeline for mirrored network traffic.
Figure 7:
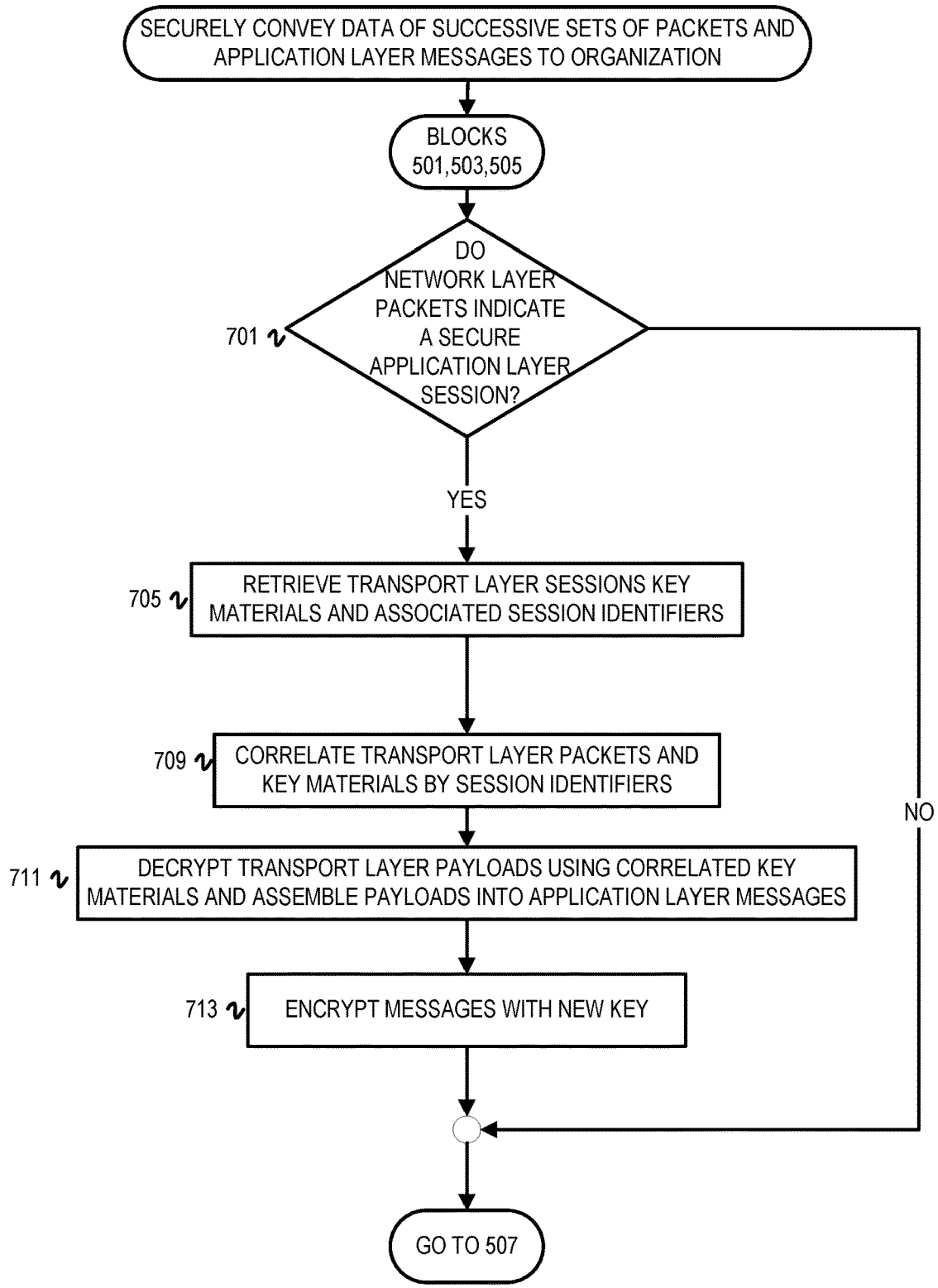
FIG. 7 is a flowchart of example operations for securely conveying data of successive sets of packets and application layer messages to an organization.

In some cases, the data or payloads of the packets from a secure VPN tunnel are secured according to another protocol (i.e., there are multiple layers of encryption). For instance, an HTTPS session may be within an IPsec tunnel. To allow an organization to perform more meaningful monitoring (e.g., deep packet inspection), the VM sink can be programmed with logic that correlates traffic and tunnel keys for each level of security and then securely conveys the traffic and traffic content for analysis/monitoring. FIGS. 6-7 relate to correlation and secure conveyance of network traffic with multiple layers of security.

FIG. 6 is an example diagram of a multi-level correlation and secure conveyance pipeline for mirrored network traffic. A VM 605 is depicted that would be a sink or associated with a sink for HTTPS traffic mirrored from IPsec tunnels. The VM 605 has been programmed with logic that implements a pipeline for correlating and securely conveying application messages protected according to a TLS implementation and transmitted within IPsec tunnels. The example pipeline includes VPN correlation logic 607, secure conveyance logic 613 with secure transport layer detection, and transport layer session correlation logic 617. In addition to tunnel key and associated identifier pairs being copied into a repository 601, security appliances are configured to copy key material (e.g., pre-master secret, a client random value, and a server random value) and corresponding transport layer session identifiers for transport layer sessions to the repository 601. A repository 603 is specified for storing the resulting data. Similar to FIGS. 1-2, FIG. 6 is annotated with letters indicating example stages of operations. FIG. 6 includes annotations for stages A-G.

Stages A and B are similar between FIGS. 1 and 6. At stage A, the VPN correlation logic 607 retrieves pairs 609 of tunnel keys and SPIs. At stage B, the VPN correlation logic 607 correlates packets and tunnel keys with the SPIs. The VPN correlation logic 607 then passes correlated packets and tunnel keys 611 to the secure conveyance logic 613.

At stage C, the secure conveyance logic 613 decrypts packets with the correlated tunnel keys. In addition, the secure conveyance logic 613 examines the decrypted packets for indication that the packet carries data for a secured application layer session. In this example, the secure conveyance logic 613 examines the inner transport layer packet headers (i.e., the transmission control protocol (TCP) packet header within the IP and IPsec tunnel encapsulation) for indication of TLS, such as a TLS version. For those packets detected as indicating TLS, the secure conveyance logic 613 passes the decrypted packets 615, which include TCP packets, to the transport layer session correlation logic 617 (Stage D).

At stage E, the transport layer session correlation logic 617 performs correlation and decryption operations similar to those of the VPN correlation logic 607 and the secure conveyance logic 613. However, the transport layer session correlation logic 617 tasks are based on TLS instead of IPsec. The transport layer session correlation logic 617 retrieves transport layer sessions key materials and transport layer session identifiers (e.g., source, destination, port(s) tuples) from the repository 601. The illustration presumes that security appliances will write the tunnel and transport layer cryptographic data to a same repository, but that is not necessary. Implementations likely maintain different queues or buffers for tunnel keys and associated identifiers and the key materials and transport layer session identifiers for efficient access. The transport layer session correlation logic 617 can retrieve the key materials and session identifiers periodically and accumulate decrypted packets for extraction of application layer messages from decrypted TCP packets. Alternatively, the transport layer session correlation logic 617 can retrieve key materials and session identifiers responsive to receipt of a set of decrypted IP packets. After retrieval, the transport layer session correlation logic 617 correlates the TCP packets and key materials by session identifiers. After correlation, the transport layer session correlation logic 617 decrypts the payloads of the TCP packets using correlated key materials and assembles them into application layer messages 619. The transport layer session correlation logic 617 would generate a cryptographic key from the key material to decrypt the TCP payloads and assemble them into application layer messages.

At stage F, the transport layer session correlation logic 617 then passes the application layer messages 619 back to the secure conveyance logic 613. The transport layer session correlation logic 617 and the secure conveyance logic 613 may be operating in shared memory, distinct memory regions, or separate memories, any of which would be allocated to the VM 605 to limit access to the decrypted data as previously described.

At stage G, the secure conveyance logic 613 performs secure conveyance operations similar to those described in FIG. 5, but also for the application layer messages. The secure conveyance logic 613 generates a random key for the current set of decrypted IP packets and set of application layer messages extracted therefrom. With the random key, the secure conveyance logic 613 encrypts the IP packets which outputs an encrypted packets file 621 and encrypts the application layer messages which outputs an encrypted messages file 623. With an organization's public key, the secure conveyance logic 613 then encrypts the random key and any corresponding cryptographic values (e.g., an IV) which outputs an encrypted key file 625. Providing the packets and the messages allows an organization to efficiently monitor/analyze traffic at the application layer and at the network layer. An organization can specify which layer of traffic is to be monitored/analyzed and the logic can be configured accordingly. Embodiments can convey any combination of IP packets, TCP packets, and application layer messages. The VM 605 then writes the files 621, 623, 625 to the repository 603.

FIG. 7 is a flowchart of example operations for securely conveying data of successive sets of packets and application layer messages to an organization. The data encompasses the decrypted IP packets including headers and payloads and higher layer data units (e.g., TCP packet, UDP datagrams, HTTP messages). Initial operations on a set of network layer packets correlated with tunnel keys would be similar to those described with reference to blocks 501, 503, 505 of FIG. 5. The operations of FIG. 7 are described with reference to a VM.

At block 701, the VM determines whether packets of the decrypted set of network layer packets indicate a secure application layer session. Based on known formatting of the network layer and transport layer packets, the VM examines fields to determine whether a value corresponding to a secure application layer session is indicated. For example, the VM reads a location defined for a TLS version field to determine whether a value has been set in the field of the TCP header. For example, functionality of a packet capture tool or a library defined function can examine packets and recognize higher layer protocols (e.g., transport layer and application layer). If the VM determines that packets indicate a secure application layer session, then operational flow proceeds to block 705. Otherwise, operational flow proceeds to block 507 of FIG. 5.

At block 705, the VM retrieves transport layer sessions key materials and associated session identifiers. After a secure appliance completes a handshake for a transport layer session, the secure appliance copies the key material that was used to generate a master secret to a specified repository accessible by the VM.

At block 709, the VM correlates the transport layer packets and key materials by session identifiers. Similar to the correlation for the tunnel keys, the VM uses the session identifiers to correlate packets and key materials. The VM can examine the transport layer packets for source, destination, and port(s) that match the retrieved session identifiers to correlate with key materials. Implementations can instead compute hash representations of session identifiers and compute hash representations of the session identifier elements found in the transport layer packet headers. For instance, the VM can build a map of indexes to key materials with the indexes being hash values of the session identifiers and then compute hash values of the tuple elements of TCP packet headers.

At block 711, the VM decrypts the transport layer payloads using correlated key materials and assembles the decrypted payloads into application layer messages. The VM uses the key material for a session to generate a cryptographic key and decrypts the transport layer packet payloads corresponding to the session. The VM then assembles the decrypted payloads into messages. The VM can invoke implementations of a network stack for the message assembly that is installed on the VM. Embodiments may convey TCP packets or UDP datagrams to an organization instead of assembling the payloads into higher layer messages.

At block 713, the VM encrypts the messages with the random key (generated at block 503). The correlation and decryption of the transport layer packet payloads continued using the VM memory to maintain security of the data. Operational flow proceeds to block 507 of FIG. 5.

Variations

The example operations presume that packets in a collection that cannot be correlated with a currently synchronized set of tunnel keys are discarded (flow from 415 to 419). This is based on a presumption that the tunnel key for the packet was not synchronized. However, this is not necessary for embodiments. Embodiments can write the packet to the correlation file as a packet without a correlated tunnel key.

The examples refer to IPsec based VPNs, but embodiments are not limited to IPsec based VPNs. Embodiments can also perform the correlation and secure conveyance for TLS VPNs (sometimes referred to as SSL VPN or TLS/SSL VPN/tunnel). TLS tunnel endpoints would update a repository with key material and session identifiers that the correlating VM will periodically retrieve (e.g., via a synchronization call in a cloud-based platform) and use to correlate the key material with application layer messages. The VM can then decrypt plaintext using the correlated key material and re-encrypt the plaintext with a random key. As mentioned previously, embodiments can correlate and securely convey network traffic at both layers to provide an organization multiple perspectives of the traffic. For instance, network traffic may be encapsulated and communicated via an inner tunnel (e.g., TLS tunnel) and an outer tunnel (e.g., IPsec tunnel). The VM would perform correlation for packets and then perform correlations for application layer messages. The VM can then provide to a customer IP packets encrypted with a random key as described earlier and provide HTTPS messages encrypted with a random key as described earlier.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations of blocks 305 and 307 can be performed in a different order or concurrently. As another example, the operations depicted in block 503 can be performed after the operations of block 505. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
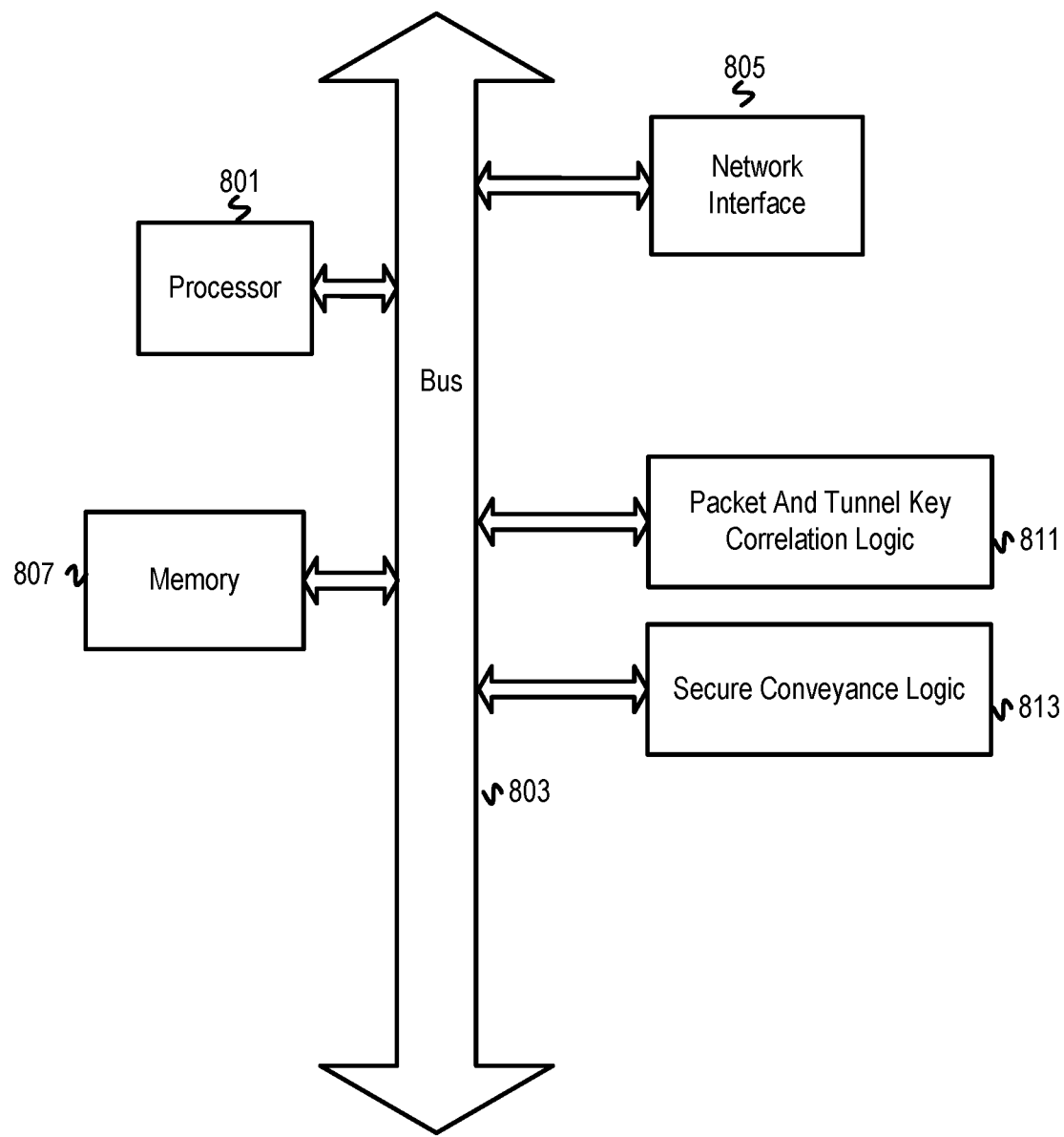
FIG. 8 depicts an example computer system with modules for correlating packets and cryptographic data communicated over different channels and for securely conveying data corresponding to the packets to an organization.

FIG. 8 depicts an example computer system with modules for correlating packets and cryptographic data communicated over different channels and for securely conveying data corresponding to the packets to an organization. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes packet and tunnel key correlation logic 811 and secure conveyance logic 813. When operating/running, the packet and tunnel key correlation logic 811 causes the system to retrieve pairings of tunnel keys and associated identifiers according to a configured retrieval interval and then correlate the retrieved tunnel keys and packets mirrored from secure VPN tunnels with the identifiers. The system correlates the tunnel keys and packets since the tunnel keys are provided via a first communication channel and the packets are provided via a second communication channel. With the correlated packets and tunnel keys, the secure conveyance logic 813 conveys the packets for an organization to analyze/monitor without regard to the tunneling technology that was employed for the secure VPNs. The secure conveyance logic 813 can be configured to provide different degrees of access to the network traffic data depending on organization specification and/or configuration of the secure conveyance logic 813. As previously described, the secure conveyance logic 813 can cause the system to encrypt the tunnel keys with a public key of an organization and provide the encrypted packets and encrypted tunnel keys as correlated to an organization. The secure conveyance logic 813 can be configured to cause the system to decrypt packets with the correlated tunnel keys, encrypt the packets with a random key, encrypt the random key with the public key of the organization, and provide encrypted packets and encrypted random key to the organization. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801. Furthermore, the depicted system can implement virtualization technology or containerization technology and run the logic 811, 813 within a secured VM or container.

The invention claimed is:

1. A method comprising:
   successively loading from a first repository into memory different subsets of packets and a corresponding cryptographic key, wherein packets from multiple streams of network traffic mirrored from secure virtual private networks (VPNs) and corresponding cryptographic keys that are periodically updated based on tunnel establishment corresponding to the secure VPNs are stored into the first repository;
   for each subset of packets loaded into the memory,
   decrypting the subset of packets with the corresponding cryptographic key;
   generating a new cryptographic key;
   encrypting at least plaintext from the subset of packets with the new cryptographic key;
   encrypting the new cryptographic key with a public key of an organization associated with the secure VPNs; and
   storing the encrypted plaintext and the encrypted new cryptographic key in a second repository associated with the organization.

2. The method of claim 1, further comprising, for each subset of packets loaded into the memory, assembling application layer messages from the decrypted subset of packets and decrypting the application layer messages into the plaintext using key material of one or more application layer sessions corresponding to the application layer messages, wherein the successively loading also loads the key material into the memory.

3. The method of claim 2, wherein the key material comprises a pre-master secret, a client random value, and a server random value.

4. The method of claim 2 wherein the application layer messages correspond to Hypertext Transfer Protocol Secure messages.

5. The method of claim 1 further comprising obtaining a certificate that includes the public key based, at least in part, on onboarding a security appliance for the organization.

6. The method of claim 1 further comprising, for each subset of packets loaded into the memory, encrypting with the public key an initialization vector corresponding to the new cryptographic key and also storing the encrypted initialization vector into the second repository.

7. The method of claim 6 further comprising writing the new cryptographic key and the initialization vector into a file, wherein encrypting the new cryptographic key and the initialization vector comprises encrypting the file.

8. The method of claim 1, wherein the secure VPNs are Internet Protocol Secure (IPsec) based VPNs.

9. A non-transitory, machine-readable medium having program code stored thereon, the program code comprising instructions to:
   successively load from a first repository into memory different subsets of packets and a corresponding cryptographic key, wherein packets from multiple streams of network traffic mirrored from secure virtual private networks (VPNs) and corresponding cryptographic keys that are periodically updated based on tunnel establishment corresponding to the secure VPNs are stored into the first repository;
   for each subset of packets loaded into the memory,
   decrypt the subset of packets with the corresponding cryptographic key;
   generate a new cryptographic key;
   encrypt at least plaintext from the subset of packets with the new cryptographic key;
   encrypt the new cryptographic key with a public key of an organization associated with the secure VPNs; and
   store the encrypted plaintext and the encrypted new cryptographic key in a second repository associated with the organization.

10. The non-transitory, machine-readable medium of claim 9, wherein the program code further comprises instructions to, for each subset of packets loaded into the memory, assemble application layer messages from the decrypted subset of packets and decrypt the application layer messages into the plaintext using key material of one or more application layer sessions corresponding to the application layer messages, wherein the instructions to successively load subsets of packets and a corresponding cryptographic key also loads the key material into the memory.

11. The non-transitory, machine-readable medium of claim 10, wherein the key material comprises a pre-master secret, a client random value, and a server random value.

12. The non-transitory, machine-readable medium of claim 10 wherein the application layer messages correspond to Hypertext Transfer Protocol Secure messages.

13. The non-transitory, machine-readable medium of claim 9, wherein the program code further comprises instructions to obtain a certificate that includes the public key based, at least in part, on onboarding a security appliance for the organization.

14. The non-transitory, machine-readable medium of claim 9, wherein the program code further comprises instructions to, for each subset of packets loaded into the memory, encrypt with the public key an initialization vector corresponding to the new cryptographic key and also store the encrypted initialization vector into the second repository.

15. The non-transitory, machine-readable medium of claim 14, wherein the program code further comprises instructions to, for each subset of packets loaded into the memory, write the new cryptographic key and the initialization vector into a file, wherein the instructions to encrypt the new cryptographic key and the initialization vector comprise instructions to encrypt the file.

16. The non-transitory, machine-readable medium of claim 9, wherein the secure VPNs are Internet Protocol Secure (IPsec) based VPNs or Transport Layer Security (TLS) based VPNs.

17. An apparatus comprising:
a processor; and
a machine-readable medium having instructions stored thereon that are executable by the processor to cause the apparatus to,
successively load from a first repository into memory different subsets of packets and a corresponding cryptographic key, wherein packets from multiple streams of network traffic mirrored from secure virtual private networks (VPNs) and corresponding cryptographic keys that are periodically updated based on tunnel establishment corresponding to the secure VPNs are stored into the first repository;
for each subset of packets loaded into the memory,
decrypt the subset of packets with the corresponding cryptographic key;
generate a new cryptographic key;
encrypt at least plaintext from the subset of packets with the generated cryptographic key;
encrypt the new cryptographic key with a public key of an organization associated with the secure VPNs; and
store the encrypted plaintext and the encrypted new cryptographic key in a second repository associated with the organization.

18. The apparatus of claim 17, wherein the machine-readable medium further has stored thereon instructions executable by the processor to cause the apparatus to, for each subset of packets loaded into the memory, assemble application layer messages from the decrypted subset of packets and decrypt the application layer messages into the plaintext using key material of one or more application layer sessions corresponding to the application layer messages, wherein the instructions to successively load subsets of packets and a corresponding cryptographic key also loads the key material into the memory.

19. The apparatus of claim 17, wherein the machine-readable medium further has stored thereon instructions executable by the processor to cause the apparatus to, for each subset of packets loaded into the memory, encrypt with the public key an initialization vector corresponding to the new cryptographic key and also store the encrypted initialization vector into the second repository.

20. The apparatus of claim 19, wherein the machine-readable medium further has stored thereon instructions executable by the processor to cause the apparatus to, for each subset of packets loaded into the memory, write the new cryptographic key and the initialization vector into a file, wherein the instructions to encrypt the new cryptographic key and the initialization vector comprise instructions to encrypt the file.

* * * * *